United States Patent

[11] 3,592,422

[72] Inventors T. O. Paine, Administrator of the National Aeronautics and Space Administration in respect to an invention of Robert M. Norman, Glendale, Calif.
[21] Appl. No. 845,807
[22] Filed July 29, 1969
[45] Patented July 13, 1971

[54] VIBRATION ISOLATION SYSTEM USING COMPRESSION SPRINGS
8 Claims, 3 Drawing Figs.
[52] U.S. Cl. ................................................. 248/18, 248/20
[51] Int. Cl. ...................................................... F16f 15/06, F16f 3/00
[50] Field of Search .................................... 248/13, 18, 20, 358, 358.1, 350

[56] References Cited
UNITED STATES PATENTS

| 1,295,059 | 2/1919 | Petterson | 248/350 X |
| 1,591,940 | 7/1926 | Joyce | 248/358.1 X |
| 1,763,682 | 6/1930 | Wallace | 248/18 |
| 2,894,711 | 7/1959 | Wingard et al. | 248/358.1 |
| 2,924,419 | 2/1960 | Wells | 248/358.1 |

Primary Examiner—William H. Schultz
Attorneys—J. H. Warden, Monte F. Mott and G. T. McCoy ABSTRACT: A vibration isolation system for isolating loads from the effect of vibrational forces transmitted to supporting structures, either from the load or from the environment, particularly suited for isolating loads from the effects of vibration normally encountered in test operations performed in environmental test chambers, and further characterized by a plurality of suspension members, each of which includes a pair of coaxially arranged, helical compression springs so mounted as to be separately subjected to compression as the suspension members are subjected to tension, whereby a test object may be supported for operation substantially free from the effects of environmental vibration through an employment of a system of minimal bulk and complexity.

PATENTED JUL 13 1971

3,592,422

ROBERT M. NORMAN
INVENTOR

ATTORNEYS

VIBRATION ISOLATION SYSTEM USING COMPRESSION SPRINGS

BACKGROUND OF THE INVENTION

1. Field of the Invention

This invention relates to shock absorbers and more particularly to a spring-loaded vibration isolation system of minimal bulk and complexity.

2. Description of the Prior Art

In performing necessary tests for spacecraft of various types, it is imperative that the test be conducted in an environment simulating, as nearly as possible, a celestial space environment. Frequently, such tests are performed within a sealed chamber capable of being evacuated to provide a simulated atmosphere as well as to be heated and cooled at selected intervals. It can readily be appreciated that such chambers are expensive and therefore the dimensions of such chambers are minimized where practical. Previously, test specimens were supported employing conventional extension springs suspended from the overhead in order that the specimen be operatively isolated from the vibrational effects originating from such sources as the earth, operative machinery, and nitrogen circulating through the cold walls of the chamber. This technique requires that, prior to the actual test, the specimen be supported in a rigid mount, frequently called "hard mount," in order that component installation and final adjustment can be made. The hard mount subsequently is removed and the specimen ultimately suspended in space by the soft tension springs. Therefore, such suspension systems heretofore employed in supporting test specimens within environmental test chambers have not fully met existing needs, due to their overall bulk and complexity and as spacecraft continue to increase in both size and weight, the inadequacies of the previously employed systems are accentuated.

OBJECTS AND SUMMARY OF THE INVENTION

This invention overcomes the aforementioned difficulties through the use of a simplified suspension system which includes a load-supporting structure adapted to be readily received within an environmental test chamber, a mount rigidly supporting the test specimen, and a plurality of vibration isolation members coupling the mount with the load-supporting structure in a manner such that excessively heavy test specimens may be assembled, delivered to and tested within the confined spaces of an environmental test chamber without necessitating system disassembly.

An object of the invention is to provide an improved vibration isolation system.

Another object is to provide a vibration isolation system particularly suited for use in environmental test chambers for supporting relatively large test specimens in a substantial vibration-free environment.

Another object is to provide a vibration isolation system of reduced size and complexity, particularly adapted for use in dampening vibration between an operative load and its supporting structure while employing resilient isolating members of minimal dimensions.

These together with other objects and advantages will become more readily apparent by reference to the following description and claims in light of the accompanying drawing.

DESCRIPTION OF THE PREFERRED EMBODIMENT

Figure 1:
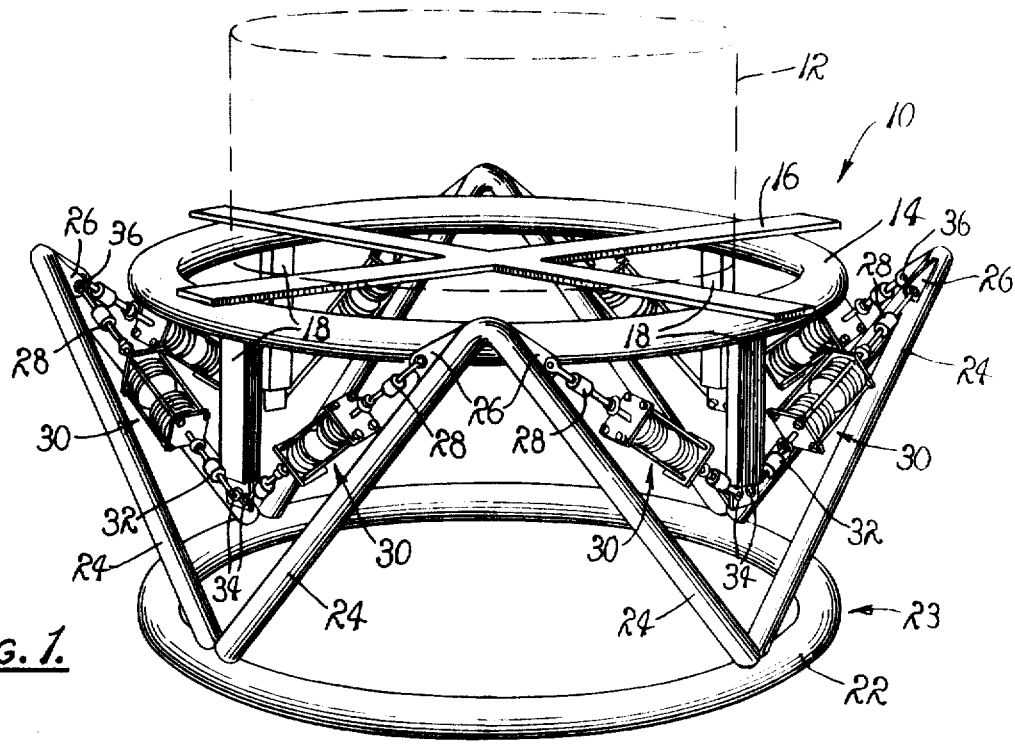
FIG. 1 is a perspective view of a vibration isolation system having a plurality of vibration isolation devices for suspending a load-mount from its base structure and embodying the principles of the present invention.

A vibration isolation system 10 is illustrated in an operative disposition having a load 12 supported thereon. The load 12 may be any selected structure. In practice, the load is a body such as a spacecraft, which is to be supported in a manner such that it is substantially isolated from the effects of vibration delivered through the floors from sources such as the earth and various types of machinery, such as pumps, which frequently are employed in the vicinity of environmental test chambers.

The load 12 is supported by a rigid mount 14 which, as illustrated, includes a plurality of load-supporting brackets 16. The brackets are of any suitable design and serve operatively to retain the load 12 in a fixed relationship relative to the mount 14. However, it is to be understood that while the brackets 16 are illustrated as being of a slatlike configuration, the brackets, in practice, are of any suitable configuration which accommodate a seating of the load 12 on the mount 14. Consequently, the brackets 16 may be varied as found desirable for mounting a given load.

The mount 14 is provided with a plurality of rigid, downwardly extended legs 18. The legs are fixed in a depending relationship with the mount and serve as a plurality of downwardly extended support members of any convenient length, for vertically supporting the mount 14 as it operatively supports the load 12.

The system 10 further includes a base 22 of an annular configuration having a suitable lower surface conveniently disposed in a plane for supporting the structure. Extending acutely from the plane of the base 22 is a plurality of rigid diagonal support beams 24. The beams are arranged in upwardly diverging pairs having lower ends rigidly coupled with the base 22 and joined together to define an included angle of approximately 90° therebetween. The beams of each pair upwardly diverge and extend outwardly at approximately 45° with respect to the plane of the base. The upper ends of the beams of adjacent pairs intersect and are interconnected whereby a rigid unitary base structure 23 is provided. The points of intersection are substantially equally spaced about the base. As employed, the base structure 23 is of an all-welded construction.

Adjacent to each of the points of intersection of the upper ends of the support beams 24, there is a mounting bracket 26 fixedly secured to each beam. From each of the brackets 26 there is suspended, by an adjustable turnbuckle 28, a vibration isolation device 30. From the lowermost end of each of the isolation devices 30 there is extended a turnbuckle 32 which is of a design quite similar to the turnbuckle 28. Each of the turnbuckles 32 is fixedly coupled with an adjacent leg 18 of the mount 14. While various means may be employed in coupling the turnbuckles with the brackets 26 and the legs 18, it has been found practical to employ convenient clevis couplings 34 of the type commonly including pins 36, in order to accommodate pivotal displacement of the vibration isolation devices 30 as a load 12 is operatively subjected to test operations.

Figure 3:
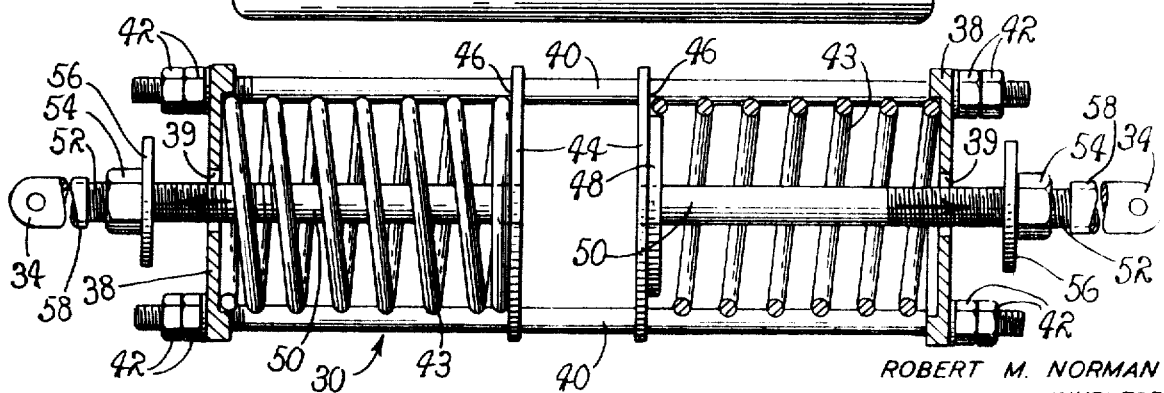
FIG. 3 is a side view of one of the vibration isolation devices illustrated in FIGS. 1 and 2.

Turning to FIG. 3, each of the isolation devices includes a pair of parallel end plates 38. Each of the plates is provided with an axial bore 39 and the plates are secured together through a plurality of parallel, elongated pins 40 having screw-threaded portions at their opposite ends, whereby the pins 4 may be inserted through appropriate openings, not designated, formed in the peripheral end plates and secured in place by means including a plurality of screw-threaded nuts 42. The nuts serve to join the pins 40 and the plates 38 into a unitary structure forming a convenient housing having axially aligned bores at its opposite ends.

Within each housing there is provided a pair of coaxially aligned compression springs 43. The springs 43 are formed of any convenient spring material and are conveniently of a helical configuration, wound closed at the opposite ends and ground flat to provide a pair of opposed transverse planar surfaces for operatively supporting the springs as compressive loads are applied. Each of the helical springs is confined between the inner planar surface of the adjacent end plate 38 and a planar surface of a compression plate 44. The compression plates 44 are disposed in a face-to-face disposition between the adjacent ends of the pair of springs 43 in a manner such that the springs are separated by a compression plate. Each of the compression plates 44 includes a working surface 46 disposed in engagement with the planar end surface of the springs 43. Formed upon the working surface there is an annular shoulder 48 which engages the inner surface of the adjacent helical spring in a manner such that the springs are caused to seat about the shoulder for retaining the plate 38 and the adjacent spring in coaxial alignment.

Figure 2:
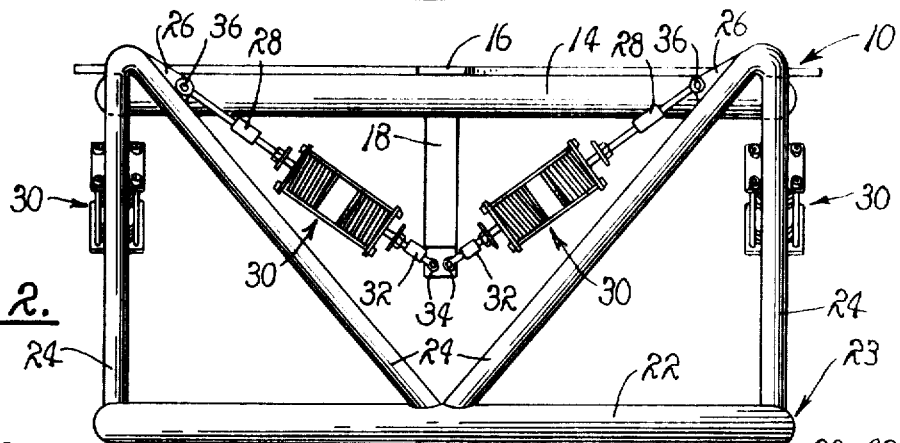
FIG. 2 is a side elevation of the structure of FIG. 1.

Extending from the working surface 46 of each of the compression plates 44 there is a tension rod 50. This rod extends concentrically through the helical springs 43 and exits the axial bore 39 of the adjacent plate 38. The rod 50 is secured to the compression plate 44 in any convenient manner, such as by welding. However, if preferred, the plate 44 and its adjacent tension rod 50 may be machined to form a unitary structure devoid of weld seams. The distal end of each of the rods 50 is provided with a plurality of external screw threads 52 which serves to receive thereon an internally screw-threaded nut 54. The nut 54 is, in practice, threadingly advanced along the rod 50 for drawing the rod through the bore 39, of the plate 38, for thus compressing the springs 43 to a preselected setting, preparatory to assembling the system. Preferably, a washer 56 is interposed between each of the adjusting nuts 54 and the external surface of the adjacent end plate 38 in order to preclude an entry of the nut 54 into the bore 39 as tension is applied, by the springs 43, to the rod 50. For purposes of illustrating an operative configuration for the isolation devices 30, the nuts 54 and associated washers 56 are shown in an axially displaced relationship with respect to the end plates 38. This, of course, is a configuration illustrated in FIGS. 1 and 2 and is assumed by the device 30 as it operatively supports the load 12. Once the load 12 is removed, the springs 43 expand and thus retract the rod 50. Also threadingly coupled to each of the rods 50, through the threads 52, is a sleeve 58, FIG. 3, of the turnbuckles 28 and 32 so that a spring-compressing force can be applied through a use of the turnbuckles to the plate 44, through the rod 50, for thus compressing the springs 43 in achieving an adjustment of the system.

While not mandatory, it should readily be apparent that if desired the nuts 54 may be torqued for drawing the tension rods 50 axially through the bore 39 for thus compressing the springs 43 into a fully compressed configuration whereby the mount 14 is caused to be supported by a "hard mount" having minimal resilient characteristics. In practice, it has been found to be desirable to employ a "hard mount" in the mounting and the adjusting of various types of hardware normally provided for the load 12. Furthermore, it is entirely feasible to employ the system 10 in a "hard mount" configuration for transporting the load.

Once the system 10 is oriented at its point of use, the nuts 54 may be "backed off" for relieving the compressive forces, as they are applied through the rods 50 to the springs 43, whereby resiliency is restored to the system. Furthermore, by adjusting the various turnbuckles 28 and 32, rough leveling of the load may be achieved, while fine leveling of the load is achieved through the use of lead weights, not shown, selectively placed about the mount 14 in appropriate locations.

As presently employed, the springs 43 are about 4 inches in diameter, while the device 30 is approximately 28 inches in length. A tension spring capable of providing the desired spring rate would necessarily be significantly longer than the combined lengths of the springs 43. Consequently, use of the system in areas wherein minimal space is available is facilitated. Additionally, by housing the helical springs within a housing, risk of destruction of expensive equipment is substantially reduced since in the event of failure of a given spring 43 the pins 40 serve to retain the resulting fragments so as to prevent a destruction of the equipment and injury to personnel. That this is particularly significant will be appreciated when it is understood that, when employed in an environmental test chamber, the operative temperature range varies through several hundred degrees, depending upon the particular environment selected. Consequently, the springs may become quite brittle and tend to fail.

OPERATION

It is believed that in view of the foregoing description, the operation of the device will be readily understood and it will be briefly reviewed at this point. The system 10 is delivered to a point wherein a load is to be supported upon the mount 14. The load 12 is then fixed to the uppermost surface of the amount 14 by the brackets 16. In practice, the nuts 54 are torqued sufficiently for drawing the tension rods 50 axially through the bores 39 of the end plates 38 for causing the plates 44 fully to compress the helical springs 43. The washers 56 act as a backing member for the nuts 54 as tensioning of the rods 50 occurs. A rigid mount thus is formed including the base ring 22, support beams 24, the turnbuckles 28 and 32, the vibration isolation devices 30, the legs 18 and the mount 14.

Once the load 12 has been positioned by the brackets 16, rough leveling of the load is achieved by "backing off" the nuts 54 for releasing the compressive forces applied through the tension rod 50 to the helical springs 43. Consequently, the system now becomes a resilient system adapted to isolate the loads from the effects of vibration. Where additional fine leveling is desired, lead weights may be applied to the mount 14 for adjusting the position of the load relative to a horizontal plane. With the system thus assembled, vibration delivered from sources external of the mount are dampened out in the individual springs 43, each acting independently of any other spring for dissipating energy by applying reactive forces to the plates 38 and 44 as the vibrations are delivered to the base 23.

It should readily be apparent that the system herein disclosed may be employed in a reverse mode so that vibrational forces delivered from the load 12 may be dissipated in the individual vibration isolation devices 30 for thus precluding transmittance of forces from the mount 14 to the base structure 23.

Accordingly, in view of the foregoing, it is to be understood that the embodiment of the instant invention affords a practical and economic solution to a perplexing problem of isolating loads from vibrations transmitted to support structure through the use of a multiplicity of compression springs mounted for independent action and reaction whereby effecting dampening is achieved.

Although the invention has been herein shown and described in what is conceived to be the most practical and preferred embodiment, it is recognized that departures may be made therefrom within the scope of the invention.

What I claim is:

1. A vibration isolation system for isolating a load from vibrational forces, comprising:
   A. a mount including means for supporting a load thereon;
   B. a base structure;
   C. a plurality of vibration isolation devices, each including a pair of adjacent, mutually independent, resilient members disposed adjacent to opposite ends of the device;
   D. coupling means coupling each of said devices at its opposite ends to said mount and to said base structure, whereby each of the devices is subjected to tensile forces; and
   E. compressive means fixedly joined between the coupling means and the resilient members adapted to deliver compressive forces acting to compress the resilient members in mutually opposite directions as the devices are subjected to tensile forces.

2. The system according to claim 1 wherein each of the resilient members comprises a helical spring wound closed and ground flat at its opposite ends.

3. The system according to claim 2 wherein each of the isolation devices including aligning means for maintaining the pairs of springs in coaxial alignment.

4. The system according to claim 3 wherein the aligning means includes:
   A. an elongated housing receiving said helical springs therein; and
   B. a pair of parallel end plates operatively closing the opposite ends of the housing, each plate including means defining a concentric opening extending therethrough.

5. The system according to claim 4 wherein the compressive means includes:
   A. tension rods, each of which is extended through an opening of said housing into a concentric relationship relative to one of said helical springs; and
   B. a pair of parallel compression plates transversely disposed between the ends of adjacent springs, each being fixedly secured to an adjacent end of a tension rod, whereby each of the helical springs is confined between a compression plate and end plate with the tension rod being concentrically extended through an end plate and adapted to compress the spring as tension is applied to the tension rod.

6. The system according to claim 5 wherein the means coupling said vibration isolation devices between the load-supporting structure and said mount include a pair of elongated, adjustable turnbuckles, each having a first end fixedly secured to a distal end of one of the tension rods, and clevis coupling mounted at the second end thereof.

7. A vibration isolation system comprising:
   A. a base;
   B. beams substantially rigidly mounted on the base and upwardly extended therefrom providing upper ends disposed substantially in a common plane in a substantially equally spaced relationship about a common circle;
   C. a mount adapted to support a load disposed substantially concentrically of the circle having downwardly extended support legs individually disposed between each adjacent pair of beams; and
   D. a resilient tension member interconnecting the upper end of each beam with the lower end of each leg disposed therebetween for supporting the mount and its load on the beams.

8. A vibration isolation system comprising:
   A. base means providing a plurality of adjacent pairs of coupling means disposed substantially in a common plane and in a substantially equally spaced relationship about a common circle;
   B. a mount adapted to support a load disposed substantially concentrically of the circle having downwardly extended support legs individually disposed between each adjacent pair of coupling means; and
   C. a resilient tension member interconnecting each of the coupling means of each adjacent pair thereof with the lower end of the leg disposed therebetween for supporting the mount and its load on the base means.